Patented May 5, 1953

2,637,636

UNITED STATES PATENT OFFICE 2,637,636

COLOR STABILIZERS

Ernest L. Walters, San Francisco, Calif., assignor to Shell Development Company, San Francisco, Calif., a corporation of Delaware No Drawing. Original application April 10, 1944, Serial No. 530,408. Divided and this application May 14, 1951, Serial No. 226,730

20 Claims. (Cl. 44—63)

This invention relates to aromatic amines which have been stabilized against color change and/or oxidative decomposition by small amounts of the herein described additives and to gasoline containing dissolved such stabilized amines.

It is an important object of the invention to provide compositions consisting essentially of or predominating in aromatic amino compounds which compositions contain oxidation inhibiting or color stabilizing amounts of nitrogenous deactivators for certain metals capable of acting as oxidation catalysts. Another purpose is to produce stable concentrates of anti-knock additives for incorporation into gasoline-type motor fuels. A further purpose is to provide improved gasoline compositions. Additional objects will be apparent from the present description and claims.

Aromatic amino compounds, upon exposure to air, often exhibit a tendency to change color as their period of contact with oxygen lengthens. This color change is the first noticeable symptom of oxidative decomposition which may continue until the amino compounds are entirely altered in composition and usefulness.

A particular employment for aromatic amino compounds, especially those of low molecular weight, is in motor fuels such as gasoline in which they exert a beneficial anti-knock effect. It will be appreciated, therefore, that if such aromatic amines are produced for incorporation in gasoline, it is especially desirable that they be stabilized against oxidation or color change, since if such decomposition sets in either before or after their addition to the base fuel, it will not only decrease their own value as a fuel component but may also promote the decomposition of the base fuel, resulting in gum formation, increased knock rating, volatility changes, etc.

Aromatic amines have also been added to cracked gasoline in small quantities in order to decrease the gum forming tendencies of the gasoline. Since such inhibition of the oxidation of the gasoline is achieved by the preferential oxidation of the amino inhibitor, it will be realized how difficult it may be to find a substance which will stabilize such aromatic amines themselves, both before and after their addition to gasoline.

For this problem, the broad class of known gasoline inhibitors has been found ineffective. Indeed many of them act as pro-oxidants or oxidation accelerators for the amino compounds. Commonly used gasoline stabilizers which were found to be pro-oxidants for aromatic amines include: para benzyl amino phenol, alpha-naphthol, 4-tertiary butyl catechol, hydroquinone, pyrogallol, beta-naphthol, para phenylene diamine and diphenyl phenylene diamine. Other pro-oxidant substances include thiophenol, thiodiglycollic acid, FeS, sulfanilic acid, salicyclic acid, brom benzene, dianisdine, iodine, iron or galvanized iron surfaces, sodium nitrite, benzoyl peroxide, lead peroxide, copper phenyl propionate, manganese oleate and stannous chloride. Gasoline inhibitors which were found to be without inhibiting effect on aromatic amines include: phenyl-alpha-naphthylamine, mixtures of cresylic acids boiling between about 220° C. and 240° C., 2,3,5,6-tetra methyl phenol, penta-methyl phenol, 2,3,5-trimethyl phenol, para, para' dihydroxy diphenyl, guaiacol, durohydroquinone, thymol, resorcinol, anthraquinone, etc.

It has now been found however, that color changes of aromatic amines may be inhibited by small amounts of nitrogenous deactivators.

Such deactivators have been employed in the past to stabilize hydrocarbons and other compositions against the catalytic action of small dissolved amounts of active metallic impurities such as copper. The mechanism through which this was accomplished was apparently by inactivating the metal through incorporating it in a chelate ring formed with the nitrogenous compound.

However, the mechanism through which these deactivators stabilize the color of aromatic amines is not known, since they are effective inhibitors for the aromatic amines in the total absence of any trace of metallic impurity.

Suitable organic nitrogen-bearing compounds having a configuration such that the proper chelate ring is formed with the metal are those in which there is a polar radical capable of forming electrovalent metal compounds such as an acid reacting group or an amine group capable of forming metal amides, separated from an aliphatic double-bonded trivalent nitrogen atom by at least two carbon atoms such that the total number of atoms in series from the nitrogen atom to the metal, inclusive, is 5 or 6. The acidic group may be —OH (in vicinal position to a double bond as in —COOH), —SH, —COSH, etc.

The aromatic amines generally added to gasoline for their anti-knock value are usually mononuclear monoamines having less than a total of about 7 carbon atoms in all alkyl radicals. Particular mention may be made of the following: aniline, N-, mono- and di-methyl or higher alkyl anilines (which may also be substituted in the nucleus); mono-, di, and tri-methyl and higher nuclearly alkylated anilines (which may also be substituted on the N atom), such as toluidines, xylidines, cumidine, pseudo cumidine, cymidine, etc., as well as suitable substituted derivatives. Mixtures of aromatic amines, as well as the individual amines, may be employed and polyamines may also be used. Likewise, aromatic-rich petroleum fractions may be nitrated and reduced to give mixtures such as described in U. S. Patents 1,844,362 and 2,252,099, which mixtures may be blended in a motor fuel according to the present invention.

However, the nitrogenous-bearing metal deactivators will also stabilize mono-nuclear amines having in the alkyl radicals a greater number of carbon atoms than indicated above, i. e. greater than 6, as well as poly-cyclic aromatic hydrocarbon amines, e. g. various naphthylamines, alkyl naphthylamines, aryl naphthylamines, di-phenylamines, anthracylamines and the like.

It is understood that the inhibitor must be well distributed throughout the substance to be protected. Thus, if the amine is a liquid under normal conditions, the inhibitor should be in true or colloidal solution. If it is a solid, the inhibitor may be incorporated by first melting the amine, distributing the necessary amount of inhibitor as by dissolving it, and then allowing the mixture to solidify; or else by merely spraying the inhibitor or a solution thereof onto the solid amine. In undiluted aromatic amines, the content of the metal deactivator may range from about 0.002% to 0.5% (by weight), preferably about 0.01% to 0.2%. In diluted amines this content may be proportionately lower.

Storage stability tests with xylidine have shown the following nitrogenous-bearing metal deactivators to be particularly effective as aromatic amine color stabilizers:

8-hydroxy quinoline
Disalicylal ethylene diamine

However, it is understood that the above are merely exemplary.

Quantitative determinations were also made by measuring the light transmission for a specific wave length (λ=550 mu) using a Coleman spectrophotometer at 70° C. and one atmosphere of air. The time necessary to reduce the light transmission in comparison with a water blank of an uninhibited sample, maintained in the dark in a glass bomb, of xylidine freshly distilled in glass apparatus was found to be 10 hours. With 0.2% w. disalicylal ethylene diamine in the xylidine the time was 51 hours.

These two xylidine samples were also stored in glass bombs in the dark at 110° F. with access to air. The uninhibited sample reached the 10% transmission point in 4½ days. The sample inhibited with 0.2% w. disalicylal ethylene diamine reached the same light transmission point in greater than 50 days.

The present metal deactivators are not gum inhibitors for cracked or unsaturate gasoline. That is, although they inhibit the oxidation of gasoline which is catalyzed by copper or other active metal (by tying up the metal in a chelate ring) they do not hinder the polymerization of unsaturate constituents (gum formation) or other oxidative deterioration which takes place in gasoline without relation to or in the absence of dissolved metallic impurities.

Hence, when the present nitrogeneous-bearing metal deactivators are used to stabilize aromatic amines which are incorporated in a cracked gasoline, an oxidation inhibitor (which is not incompatible with the amines) may be added to the composition. On the other hand, when the aromatic amines stabilized by the nitrogenous-bearing metal deactivator are added to an initially stable (or saturate type) gasoline to which is also added unstable tetra alkyl lead, the stabilized aromatic amines will act to stabilize the tetra alkyl lead so that little or no oxidation inhibitor need be added to stabilize the tetra alkyl lead and/or the initially stable gasoline which is rendered unstable by the tetra alkyl lead.

By an initially stable or saturate type gasoline is meant a gasoline such as aviation gasoline composed of straight run or casing head gasoline, cyclopentane, aromatics, alkylate, hydroformed fractions and the like which are substantially free from olefins or other unstable constituents.

Since many gasoline anti-oxidants or gum inhibitors are pro-oxidant for aromatic amines (as pointed out earlier), care should be taken that only those inhibitors which have no detrimental effect on the amines be used to stabilize the gasoline which contains them. Of particular advantage for this purpose are the polyalkyl phenols which are anti-oxidants for aromatic amines and for metallic anti-knock compounds (such as tetra ethyl lead and iron carbonyl) as well as for unstable gasoline.

These oxidation inhibitors are disclosed in my copending application, Serial No. 518,663, now Patent No. 2,410,847, of which this is a continuation-in-part; and in the copending applications of Luten and De Benedictis, Serial No. 518,666, now abandoned, and of Luten Serial Nos. 518,667, now Patent No. 2,410,829 and 518,638, now Patent No. 2,376,616, all filed January 17, 1944, and is a division of my copending application Serial No. 530,408, filed April 10, 1944, which has matured into U. S. Patent 2,573,779.

These inhibitors are polyalkyl phenols containing at least two alkyl radicals in the ortho or para positions. A third alkyl radical may be present which may be in ortho, para or meta position. Preferably one of the two or three alkyl radicals is a tertiary alkyl radical, the other radical or radicals being primary or secondary alkyls. Those alkyl phenols containing a total of no more than about 12 carbon atoms in all alkyl radicals (or a total of no more than about 18 carbon atoms counting the nuclear atoms) are preferred.

Such compounds are exemplified by the following inhibitors:

2,4,6-trimethyl phenol (mesitol)
2,6-dimethyl phenol
2,4-dimethyl-6-secondary butyl phenol
2,4-dimethyl-6-tertiary amyl phenol
2,4-dimethyl-6-tertiary octyl phenol
2,4-dimethyl-6-tertiary butyl phenol
2,3-dimethyl-6-tertiary butyl phenol
2,3,6-trimethyl phenol
2,4-ditertiary butyl-6-methyl phenol
2-tertiary butyl-4-methyl phenol
2-tertiary butyl-4-ethyl phenol
2,4-dimethyl phenol
2-methyl-4-tertiary butyl phenol Concentrates of the earlier enumerated knock reducing aromatic amines may thus be made containing a color stabilizing amount of the present nitrogen-bearing metal deactivators plus an additional amount of the above polyalkyl phenols sufficient to stabilize the gasoline (which may or may not contain tetra alkyl lead) to which the amines are added. Suitable amounts of the polyalkyl phenols in an amine concentrate which is adopted for incorporation into gasoline is about 0.01% to 1% w., a preferred range being about 0.05% to 0.5% w.

Effective total amounts of the polyalkyl phenolic inhibitors in a gasoline are generally between about 0.0001% to 0.1% (by weight), a preferred range being from about 0.001% to about 0.01% or 0.1%. The aromatic amines may be employed in about 0.25% to 3% (by volume) in a gasoline although higher or lower quantities can also be used. The upper limit is usually prescribed by maximum boiling range specifications of the gasolines. Since the amines are relatively high boiling, they may raise the upper boiling range of the gasoline above permissible limits if used in excessive amounts. On the other hand, amounts of the amines below the lower limit indicated give, as a rule, insufficient improvement in knock rating to warrant their use. About 1% has been found to be particularly advantageous. The combination of aromatic amines and the specific polyalkyl phenols has a synergistic stabilizing effect when applied particularly to saturated, initially stable gasolines rendered unstable by the addition of metal anti-knock compounds, as well as to unsaturated, initially unstable gasolines (such as cracked gasolines) with or without metal anti-knock compounds. Upon to about 6 cc. per gallon of tetra ethyl lead or an equivalent amount of another tetra alkyl lead may normally be added to gasoline.

Solubilizers for the aromatic amines may also be present, particularly in gasolines which contain but a small amount of aromatic constituents. Such mutual solvents may be low molecular weight alcohols, ethers, ketones (in particular five or six carbon atom unsymmetrical ketones), aromatics such as benzene, toluene, etc.

If the amines have already given rise to colored products before a color stabilizer has been added, this color may be removed (before incorporation of the stabilizer) by distilling the amine with damp fuller's earth or other suitable absorbent. A concentration of 5% water and 5% fuller's earth has been found satisfactory for this purpose.

The invention claimed is:

1. A composition of matter comprising a predominant amount of an aromatic amine in contact with a minor amount, sufficient to prevent color deterioration of said aromatic amine of 8-hydroxy quinoline.

2. A composition in accordance with claim 1, wherein the aromatic amine is xylidine.

3. A composition of matter comprising a predominant amount of an aromatic amine in contact with a minor amount, sufficient to prevent color deterioration of said aromatic amine, of 8-hydroxy quinoline and an oxidation inhibiting amount of 2,4-dimethyl-6-tertiary butyl phenol.

4. A composition in accordance with claim 3, wherein the aromatic amine is xylidine.

5. A composition of matter comprising a predominant amount of an aromatic amine in contact with a minor amount, sufficient to prevent color deterioration of said aromatic amine, of 8-hydroxy quinoline and an oxidation inhibiting amount of a polyalkyl phenol anti-oxidant which is harmless to said amine.

6. A composition of matter comprising a predominant amount of an aromatic amine in contact with a minor amount, sufficient to prevent color deterioration of said aromatic amine, of 8-hydroxy quinoline and an oxidation inhibiting amount of 2,4-ditertiary butyl-6-methyl phenol.

7. A composition in accordance with claim 6, wherein the aromatic amine is xylidine.

8. The method of inhibiting color deterioration of aromatic amines dispersed in a liquid vehicle containing a poly alkyl phenolic anti-oxidant which is harmless to said amines, which comprises contacting the amines with 8-hydroxy quinoline.

9. The method of inhibiting color deterioration of aromatic amines dispersed in a liquid vehicle containing 2,4-dimethyl-6-tertiary butyl phenol, which is harmless to said amines, which comprises contacting the amines with 8-hydroxy quinoline.

10. The method in accordance with claim 9, wherein the aromatic amine is xylidine.

11. The method of inhibiting color deterioration of aromatic amines dispersed in a liquid vehicle containing 2,4-ditertiary butyl-6-methyl phenol, which is harmless to said amines, which comprises contacting the amines with 8-hydroxy quinoline.

12. The method according to claim 11, wherein the aromatic amine is xylidine.

13. An aviation gasoline composition substantially free from unsaturated gum-forming hydrocarbons and containing an aromatic amine and tetra ethyl lead, stabilized against gum formation and tetra ethyl lead decomposition by the incorporation therein of a minor proportion of 8-hydroxyquinoline.

14. An initially stable, saturate type gasoline additionally containing up to about 6 cc./gal. tetra alkyl lead, an amount, sufficient to stabilize the tetra alkyl lead of a mononuclear aromatic amine and 8-hydroxy quinoline sufficient to inhibit color change of the amine.

15. A stable gasoline-type motor fuel comprising a knock-reducing amount of a mononuclear aromatic amine and 8-hydroxy quinoline in an amount sufficient to inhibit color change of the amine, and an oxidation inhibiting amount of a poly alkyl phenol which is harmless in relation to oxidation of the amine.

16. The composition of claim 15 wherein the phenol is 2,4-dimethyl-6-tertiary butyl phenol.

17. The composition of claim 15 wherein the phenol is 2,4-ditertiary butyl-6-methyl phenol.

18. An aviation fuel substantially free from unsaturated gum-forming hydrocarbons and stable to gum formation and TEL decomposition comprising a minor proportion of xylidine and inhibited by the incorporation therein of a small amount of 8-hydroxy quinoline.

19. A gasoline composition according to claim 18 which contains 0.002 to 0.5% of 8-hydroxy quinoline.

20. A gasoline composition according to claim 18 which contains 3% xylidine and 0.002 to 0.5% of 8-hydroxy quinoline.

ERNEST L. WALTERS.

References Cited in the file of this patent

UNITED STATES PATENTS

| Number | Name | Date |
|---|---|---|
| 1,947,578 | Bond | Feb. 20, 1934 |
| 2,030,033 | McConnell | Feb. 4, 1936 |
| 2,202,877 | Stevens | June 4, 1940 |
| 2,285,878 | White | June 9, 1942 |